United States Patent [19]
Eernisse et al.

[11] B 3,981,480

[45] Sept. 21, 1976

[54] VARIABLE GAS LEAK RATE VALVE

[75] Inventors: Errol P. Eernisse; Gary D. Peterson, both of Albuquerque, N. Mex.

[73] Assignee: The United States of America as represented by the United States Energy Research and Development Administration, Washington, D.C.

[22] Filed: Dec. 19, 1974

[21] Appl. No.: 534,333

[44] Published under the second Trial Voluntary Protest Program on February 17, 1976 as document No. B 534,333.

[52] U.S. Cl. ............................................... 251/129
[51] Int. Cl.² ........................................ F16K 31/02
[58] Field of Search ................................... 251/129

[56] References Cited
UNITED STATES PATENTS 3,465,732  9/1969  Kattchee .................... 251/129 X
3,614,486  10/1971  Smiley ......................... 251/129 X

FOREIGN PATENTS OR APPLICATIONS 1,106,133  5/1961  Germany ........................ 251/129

*Primary Examiner*—Arnold Rosenthal
*Attorney, Agent, or Firm*—Dean E. Carlson; Dudley W. King; Richard E. Constant

[57] ABSTRACT

A variable gas leak rate valve which utilizes a poled piezoelectric element to control opening and closing of the valve. The gas flow may be around a cylindrical rod with a tubular piezoelectric member encircling the rod for seating thereagainst to block passage of gas and for reopening thereof upon application of suitable electrical fields.

4 Claims, 3 Drawing Figures

VARIABLE GAS LEAK RATE VALVE

BACKGROUND OF THE INVENTION

Variable gas leak rate valves are used for precise control of gas admission to various laboratory and industrial instruments or systems, including by way of example, accelerators, spectrometers and surface and plasma physics apparatus. Prior valves utilized for this purpose often relied on a seal produced mechanically between two solid pieces using such as a tapered fit or a deformable soft metal ring-seal in which the sealing members are precisely moved with respect to each other. These schemes suffer from a lack of repeatability or smooth control over orders of magnitude of leak rate. Other valves relied on the leakage produced between two solid materials having different thermal expansions by heating the materials to provide a wide range control of leak rates but required very large amounts of electrical power to operate and suffered from corrosion when reactive gases flow between the heated valve members.

SUMMARY OF INVENTION

In view of the above, it is an object of this invention to provide a variable gas leak rate valve which is of simple construction and which may be controlled electrically with very low power requirements.

It is a further object of this invention to provide such a variable gas leak rate valve which may repeatably produce a precise gas flow rate change per applied voltage change.

It is a further object of this invention to provide a variable gas leak rate valve which may readily be used to convey corrosive gases therethrough.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art within the scope of the claims.

This invention relates to a variable rate gas leak valve which utilizes the expansion and contraction of poled ferroelectric ceramic or piezoelectric materials when appropriately subjected to electric fields to effect the opening and closing of a valve seating arrangement and to control the flow of gas therethrough in a precise and repeatable fashion.

DESCRIPTION OF DRAWING

The invention is illustrated in the accompanying drawing wherein.

DETAILED DESCRIPTION

Figure 1:
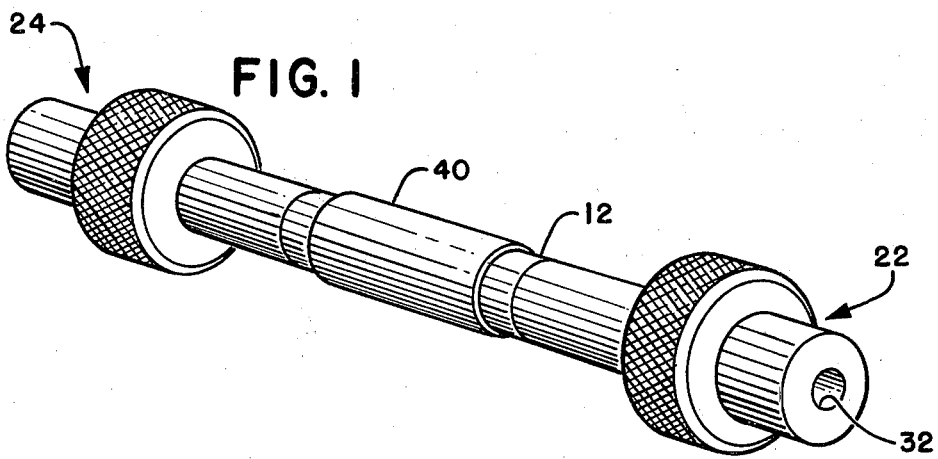
FIG. 1 is a perspective view of a variable gas leak rate valve which incorporates features of this invention.
Figure 2:
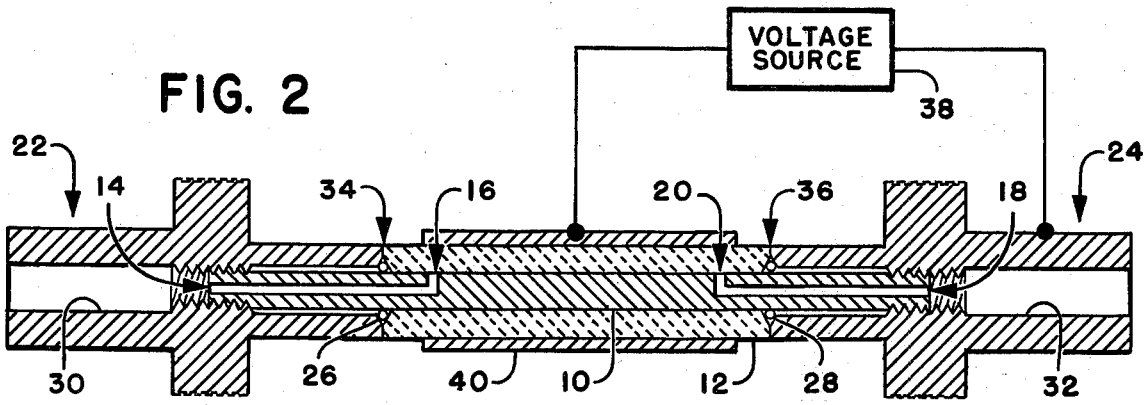
FIG. 2 is a cross-sectional view of FIG. 1.

The variable gas leak rate valve of this invention, as shown in FIGS. 1 and 2, may include a cylindrical rod 10 which acts as a valve body and a piezoelectric sleeve or tube 12 which encircles a portion of rod 10. The outer surface of rod 10, at a location intermediate its ends and within the extremities of sleeve 12, may be shaped together with a coacting inner surface portion of sleeve 12 to act as a valve seat and valve member. Rod 10 is provided with a passageway 14 extending from one end of the rod to an opening 16 in the outer surface of the rod underlying the inner surface of sleeve 12. A similar passageway 18 is provided at the other end of rod 10 communicating with an opening 20 in the outer rod surface underlying sleeve 12 and spaced from opening 16. The openings 16 and 20 are separated by the coating portion of rod 10 and sleeve 12 which may be fitted in gas tight relationship when the valve is in its closed position so as to block flow of gas from passageway 14 to passageway 18 between or along the interface of rod 10 and sleeve 12.

The passageways 14 and 18 may be formed in any suitable manner such as by generally centrally disposed bores extending longitudinally part-way along the length of rod 10 but terminating before they intersect together with generally radially disposed bores communicating between openings 16 and 20 and the central bore.

Sleeve 12 may be held in the desired position overlapping openings 16 and 20 in rod 10 by appropriate couplers 22 and 24 which may be threaded or otherwise fastened to the ends of rod 10, as shown. Suitable sealing elements, such as O-rings 26 and 28, may be provided between the adjoining ends of couplers 22 and 24 and sleeve 12 and the outer surface of rod 10 to provide a gas tight seal around rod 10 and the ends of sleeve 12. Any gas flow between passageways 14 and 18 of rod 10 must thus be conveyed at the interface around the outer surface of rod 10 within the inner surface of sleeve 12. Couplers 22 and 24 may include suitable passageways 30 and 32 for connection to the desired vacuum and gas systems in which the valve is to be incorporated. It is preferred that the abutting ends of sleeve 12 and the couplers 22 and 24, such as shown at 34 and 36, be juxtaposed with respect to each other so as to provide repeatability in the operation of the valve by mechanically and rigidly fixing the position of sleeve 12 between couplers 22 and 24.

Rod 10 may be made of a material which is compatible with the gases which are to be used and the system to which it is to be connected, such as stainless steel, or other noncorrosive materials. The piezoelectric sleeve 12 is preferably formed from a piezoelectric material which exhibits the piezoelectric effect and changes dimensions under the influence of an electric field. For example, a ferroelectric material exhibits a high piezoelectric effect and may exhibit a remanent polarization when poled or polarized in any desired direction. Suitable piezoelectrics which exhibit these characteristics and which may be formed in the preferred tubular shape include such ferroelectric ceramics as certain lead zirconate titanates and barium titanate. Such materials may commonly require a poling field of from about 5 to 25 kilovolts/centimeter and exhibit piezoelectric effects of about 2 to $400 \times 10^{-7}$ centimeters/kilovolt.

When such a ferroelectric material in the configuration indicated by sleeve 12 is initially poled in the radial or longitudinal direction and an electric field is applied in the radial direction, for instance opposite in polarity to the radial poling field, the piezoelectric sleeve 12 may expand in a longitudinal direction while simultaneously shrinking in a radial direction. With the sleeve 12 clamped between couplers 22 and 24, the net effect will be to produce a minute gap between rod 10 and the mating surfaces of sleeve 12 to effect a generally tubular shaped gas passageway between openings 16 and 20 around rod 10. Such an electric field may be produced by coupling a suitable variable voltage source 38 between rod 10, such as through coupler 24 which is electrically connected to rod 10, and an appropriate electrode 40 disposed on the outer surface of sleeve 12 over the portions of sleeve 12 which effect the blocking of gas flow between passageways 14 and 18 in rod 10. It can be seen that if the outer surface of rod 10 and the inner surface of sleeve 12 are formed such that the surfaces are fitted in gas tight relationship with no applied voltage between rod 10 and electrode 40, the application of the described polarity electric field by voltage source 38 will open a gas passageway around rod 10 between rod 10 and sleeve 12 for flow of gas from passageway 14 to passageway 18, and when the electric field is reduced to zero or the voltage source 38 turned off, the sleeve 12 will contract in its longitudinal direction and expand in its radial dimension to again block gas flow therebetween.

If it is desired, the rod 10 and sleeve 12 can be shaped so that the mating surfaces are not in a gas tight relationship with no voltage applied between rod 10 and electrode 40 and a field then applied with a polarity, for instance in the same direction as the poling voltage direction, to effect an expansion in the radial dimension of sleeve 12 and a contraction in the longitudinal direction to produce a gas tight relationship. The reduction of the electric field to zero may then partially open the valve and permit flow of gas. If the electric field is reversed, for instance in a direction opposite in polarity from the poling voltage direction, the passageway between rod 10 and sleeve 12 may be expanded still further and thus provide a wider range of gas flow. Voltage source 38 in this application would have to be capable of providing different polarity and as well as different amplitude voltages. The electrode 40 may be formed by painting a suitable conductive paste or slurry on the outer surface of sleeve 12 or by conventional vapor or the like deposition of a metallic or metallized layer.

It has been found that with the arrangement described, gas flow may be controlled over a wide range with predictable and repeatable flow rates with respect to the amplitude of electric field applied. In addition, the flow rates achieved do not vary from one application to another, after the device has been suitably aged through a number of cycles.

Figure 3:
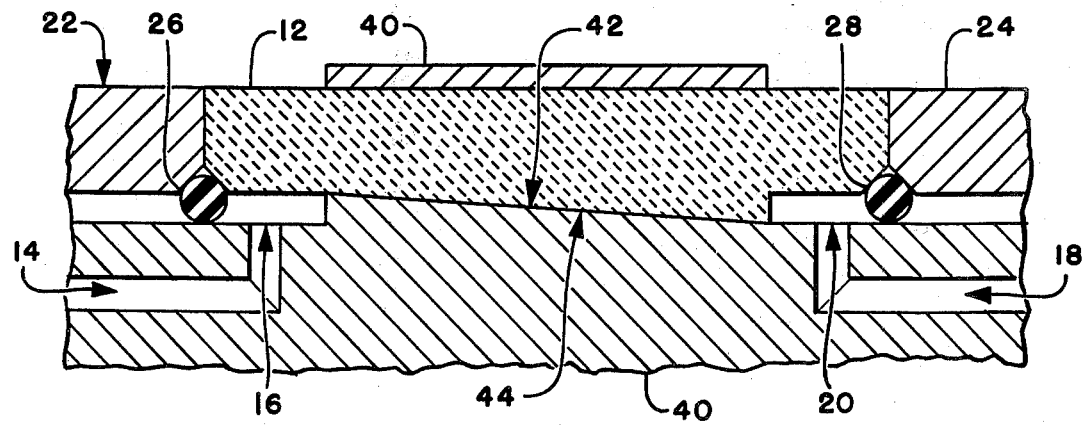
FIG. 3 is an expanded cross-sectional view of a portion of the valve shown in FIGS. 1 and 2 to illustrate further details thereof.

A precise seating of rod 10 to sleeve 12 may be achieved by providing an outwardly tapered portion 42 on the outer surface of rod 10 between openings 16 and 20, as shown in FIG. 3, which may be fitted against a correspondingly inwardly sloping or tapered portion 44 of sleeve 12. The electrode 40 should have sufficient width so as to encricle the mating portions of tapers 42 and 44 to insure a generally uniform electric field through the sleeve 12 adjacent to the mating portions and consequently a uniform piezoelectric effect coextensive therewith. The tapered portions may be seated in a gas tight relationship by proper adjustment of couplers 22 and 24.

Since the piezoelectric materials utilized for sleeve 13 inherently exhibit a high dielectric constant and low conductivity, the combination of rod 10, sleeve 12 and electrode 40 act as a low leakage capacitor. This results in a very low current and power drain from voltage source 38, typically exhibiting current drains in microamperes and power requirements of milliwatts or less.

A variable gas leak rate valve having a piezoelectric sleeve 12 with an inner radius of about 0.33 centimeters, an outer radius of about 0.7 centimeters and length of about 2.16 centimeters formed from a lead zirconate-lead titanate ferroelectric material containing a niobium dopant was provided with a slight taper to fit a correspondingly formed outwardly disposed taper on a central stainless steel rod 10 to provide a gas tight fit with no electric field applied. The passageways 14 and 18 in rod 10 had a diameter of about 0.1 centimeter. The leak rate was checked by connecting the valve between a 250 liter/second turbomolecular pump and atmospheric pressure. The measured vacuum level at the pump side of the valve was varied from a base pressure about $8 \times 10^{-7}$ Torr with +2000 volts radially applied across the sleeve to about $5 \times 10^{-6}$ Torr when −2000 volts was radially applied. The valve was repetitively operated by varying the voltage in steps of 500 volts from −2000 volts to +2000 volts and measurements made of the gas leak rate at the various voltage increments. It was found that the leak rate varied continuously from about 0 to about $2.8 \times 10^{-4}$ Torr-liter/second with a $1.4 \times 10^{-7}$ Torr-liter/second-volt variation. The leak rate at each voltage step varied less than about 0.5% for each cycle of operation.

If it is desired, a rod 10 of nonconductive material may be utilized and the electric field provided between couplers 22 and 24 using a piezoelectric sleeve 12 poled initially in either radial or longitudinal direction to effect a similar dimensional change in the sleeve 12 and a corresponding opening and closing of the valve. Alternatively, the entire rod 10 or a portion thereof may be formed from poled piezoelectric material and held within an appropriate sleeve and coupler so that application of longitudinal fields through the piezoelectric portion of rod 10 would effect closing and opening of the valve between the rod and sleeve interface. However, these arrangements generally require significantly higher electrical voltages to operate since the voltage required is a function of the ceramic length through which the voltage field is being applied. It can also be seen that the piezoelectric material can be used in other valve configurations to effect movement of a valve member with respect to a valve seat upon application of suitable poling of the piezoelectric and application of corresponding electric fields thereto. Such valves will generally be more complex than the variable gas leak rate valve described above and may be more difficult to provide the necessary electric field biasing arrangements required to operate the valve than that described.

What is claimed is:

1. A variable gas leak rate valve comprising an elongated metallic rod having first passageway extending from one end of said rod to an opening in its outer surface intermediate the rod ends and a second passageway extending from the other end of said rod to an opening in its outer surface spaced from said first passageway opening; a piezoelectric sleeve fitted in gas tight relationship around a portion of said rod intermediate said passageway openings, said sleeve being poled in the radial direction and normally blocking gas flow between said openings; an electrode disposed on the outer surface of said sleeve coextensive with said gas tight portion; means for sealing the ends of said sleeve to end portions of said rod; and means for coupling voltage bias between said rod and said electrode to effect communication between said passageways through the interface between said rod and said sleeve.

2. The valve of claim 1 including means for varying the amplitude of said voltage.

3. The valve of claim 1 wherein said gas tight portions of said rod and the inner fitted surface of said sleeve are taper fitted together.

4. The valve of claim 1 wherein said sealing means include couplers connected to said rod ends abutting and sealed to the ends of said sleeve.

* * * * *